(12) United States Patent
Mertz

(10) Patent No.: US 6,791,054 B1
(45) Date of Patent: Sep. 14, 2004

(54) ELECTRODE HOLDING AND DISPENSING ASSEMBLY FOR ELECTRICAL DISCHARGE MACHINING APPARATUS

(75) Inventor: Steven Craig Mertz, Hopkinsville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/631,180

(22) Filed: Jul. 31, 2003

(51) Int. Cl.[7] .............................. B23H 1/04; B23H 7/26
(52) U.S. Cl. .................................. 219/69.15; 219/69.11
(58) Field of Search .......................... 219/69.11, 69.15; 483/16, 58; 204/224 M, 297.01

(56) References Cited

U.S. PATENT DOCUMENTS

| | | | | |
|---|---|---|---|---|
| 3,600,547 A | * | 8/1971 | Turner | 219/69.15 |
| 3,639,225 A | * | 2/1972 | Malkowski et al. | 204/212 |
| 4,633,053 A | * | 12/1986 | Puthran | 219/69.15 |
| 4,814,573 A | * | 3/1989 | Check et al. | 219/69.15 |

* cited by examiner

Primary Examiner—Geoffrey S. Evans
(74) Attorney, Agent, or Firm—Adams Evans P.A.; V.G. Ramaswamy

(57) ABSTRACT

An electrode holding and dispensing assembly for use with an electrical discharge machining apparatus. The assembly includes a guide rail having a channel formed therein and an electrode dispenser positioned to deliver electrodes to the channel. A slider is slidingly received in the channel for advancing electrodes delivered to the channel from the dispenser to an electrode seating site located in the channel, where the electrode is securely held during machining operations.

19 Claims, 6 Drawing Sheets

US 6,791,054 B1

ELECTRODE HOLDING AND DISPENSING ASSEMBLY FOR ELECTRICAL DISCHARGE MACHINING APPARATUS

BACKGROUND OF THE INVENTION

This invention relates generally to electrical discharge machining and more particularly to handling electrodes used in electrical discharge machining.

Electrical discharge machining (EDM) is a well known process for forming features, such as holes, slots and notches of various shapes and configurations, in an electrically conductive workpiece. Conventional EDM apparatuses typically employ an electrode, having a specific shape, that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

There are many EDM operations in which several distinct features are machined into a single workpiece. For example, turbine blades used in gas turbine engines commonly have many cooling holes formed therein. The cooling holes permit an outflow of coolant from internal passages to effectively cool the blade during its high temperature operation. These cooling holes are ordinarily formed by an EDM procedure. To increase the manufacturing output of such parts, it is common to use an EDM electrode having a plurality of prongs or stingers that are sized and shaped to machine a row of cooling holes in a single operation. Such electrodes are known as a comb electrodes.

Given the nature of the EDM process, the electrodes wear down quickly and must be replaced often. Typically, a new electrode is used for each part that is machined. Each time an electrode is replaced, the EDM operator must remove the new electrode from its packing and load it by hand into the electrode holder of the EDM apparatus. This process results in a lot of manual handling of the electrodes. Current packaging procedures by the electrode manufacture also entail much manual handling of the electrodes.

Comb electrodes are very fragile and easily damaged during transportation from the manufacturer and handling by the end user. A badly damaged electrode is unusable and must be discarded, resulting in the loss of the cost of the electrode. Even more troublesome with comb electrodes is that the stingers can become slightly bent during manual handling. The amount of damage can be so minimal that the operator does not realize that the electrode is damaged and proceeds with the EDM operation. However, even an undetectable amount of stinger bend can result in a misaligned or malformed feature that requires the entire part to be scrapped, which can represent a substantial cost.

Current efforts to avoid damaged electrodes are limited to operator awareness training. However, such training efforts do not address the root cause of damaged electrodes, which is the large amount of manual handling of the electrodes. Accordingly, it is desirable to have a means for replacing EDM electrodes that eliminates or greatly reduces the amount of manual handling of the electrodes.

BRIEF SUMMARY OF THE INVENTION

The above-mentioned need is met by the present invention, which provides an electrode holding and dispensing assembly for use with an electrical discharge machining apparatus. The assembly includes a guide rail having a channel formed therein and an electrode dispenser positioned to deliver electrodes to the channel. A slider is slidingly received in the channel for advancing electrodes delivered to the channel from the dispenser to an electrode seating site located in the channel, where the electrode is securely held during machining operations.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
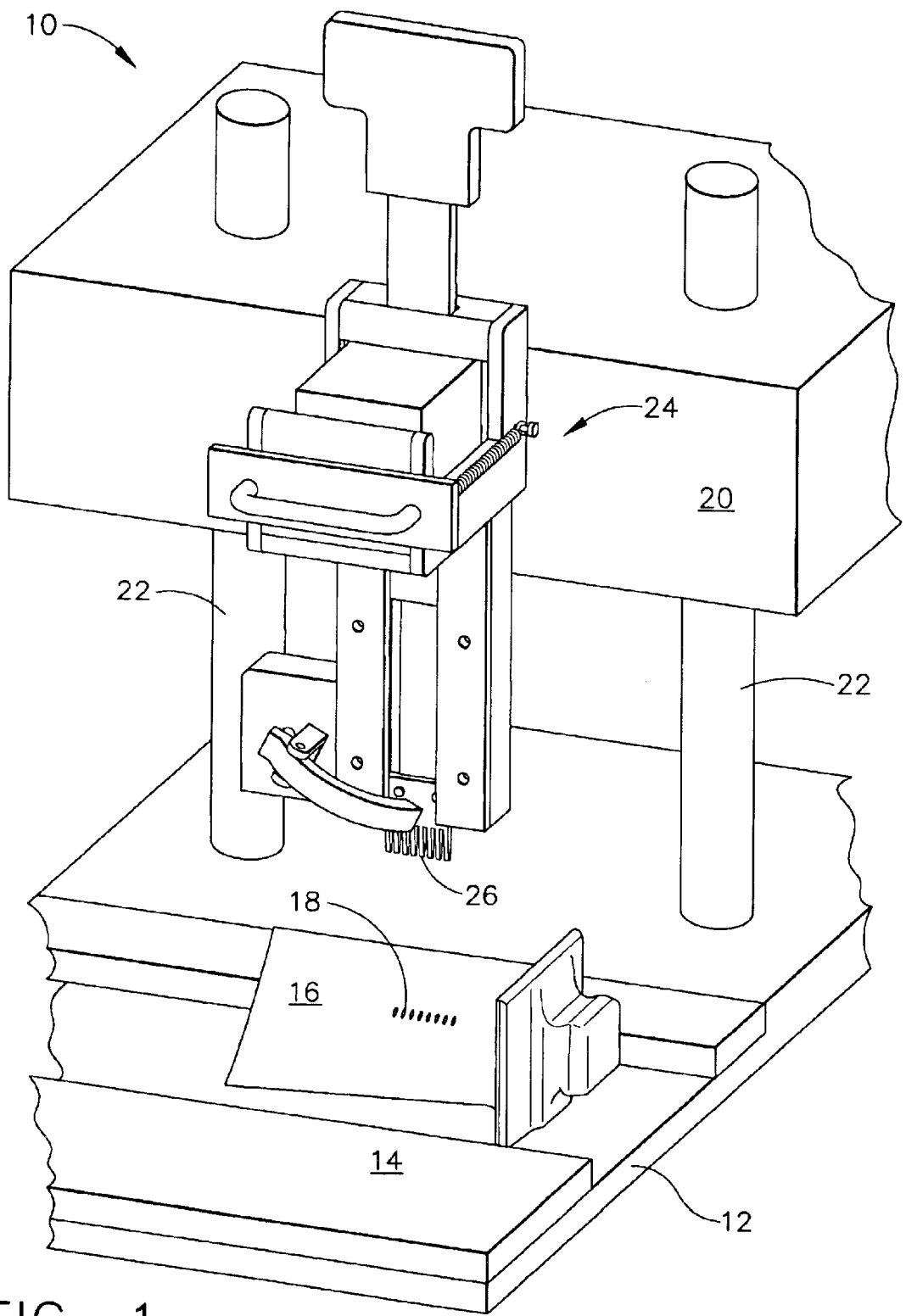
FIG. 1 is a perspective view of an electrical discharge machining apparatus including an electrode holding and dispensing assembly.

Referring to the drawings wherein identical reference numerals denote the same elements throughout the various views, FIG. 1 shows an electrical discharge machining (EDM) apparatus 10. The EDM apparatus 10 includes a base 12 having a workpiece fixture 14 mounted thereon for holding a workpiece 16. The exemplary workpiece shown in FIG. 1 is a turbine blade for use in a gas turbine engine. Turbine blades are exposed to extremely high temperatures during engine operation and are thus internally cooled to prolong service life. Turbine blades are ordinarily made by a process in which a casting of the blade is made with one or more internal passages that are designed to accept a coolant fluid. A number of cooling holes 18 are then machined into the surface of the blade to provide an egress for the coolant. The cooling holes are precisely located on the blade to provide optimum cooling effect. The present invention is not limited to such workpieces and is applicable to virtually any workpiece that is to be electrical discharge machined.

The EDM apparatus 10 further comprises an electrode holder 20 slidably mounted above the base 12 on a pair of columns 22 extending upwardly from the base 12. The electrode holder 20 can move vertically along the columns 22, toward or away from the workpiece fixture 14. An electrode holding and dispensing assembly 24 is mounted on the front face of the electrode holder 20 for movement therewith. As will be described in more detail below, the electrode holding and dispensing assembly 24 holds an electrode 26 in position for machining the workpiece 16. In the illustrated example, the electrode 26 is a comb electrode having a plurality of prongs or stingers that are sized and shaped to machine a group of the cooling holes 18 in a single EDM operation. It should be noted that while FIG. 1 shows a single electrode holding and dispensing assembly mounted to the electrode holder 20, it would be possible to mount additional electrode holding and dispensing assemblies on the front face of the electrode holder 20. In which case, the EDM apparatus 10 would include an additional workpiece fixture corresponding to each additional electrode holding and dispensing assembly.

As in known in the art, an EDM control system (not shown), which includes a power supply and a controller such a computer numerical control, is provided for moving the electrode holder 20 towards and away from the workpiece 16. During a machining operation, the electrode holder 20 is moved downward on the columns 22 to advance the electrode 26 into engagement with the workpiece 16 to initiate machining thereof. The electrode holder 20 is moved upward along the columns 22 to retract the electrode 26 after the machining operation is completed.

Figure 2:
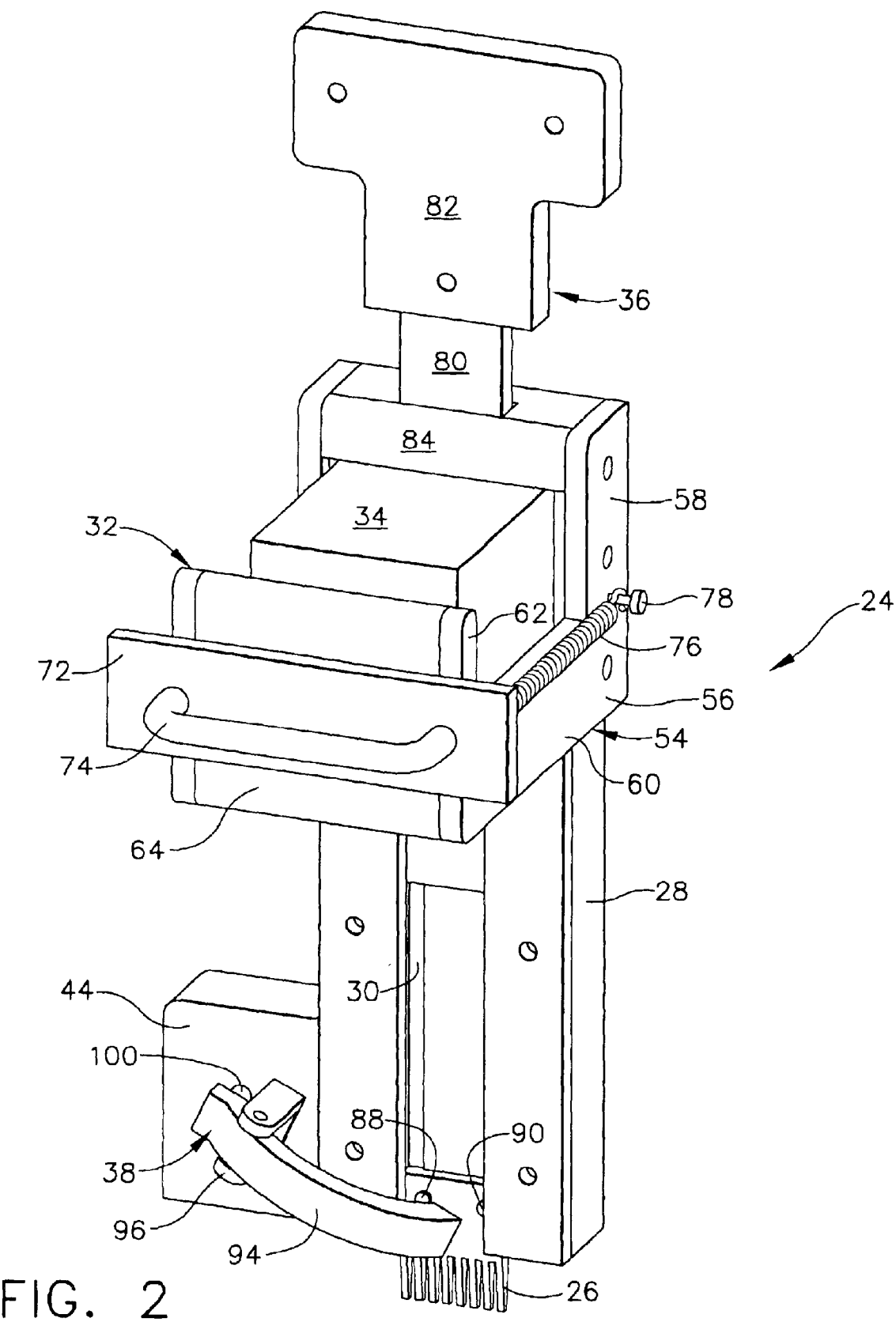
FIG. 2 is a detailed perspective view of the electrode holding and dispensing assembly of FIG. 1.

Turning to FIG. 2, the electrode holding and dispensing assembly 24 includes a guide rail 28 mounted directly to the front face of the electrode holder 20. The guide rail 28 is arranged vertically on the electrode holder 20 with its lower end extending below the bottom edge of the electrode holder 20. A lengthwise-extending channel 30 is formed in the front surface of the guide rail 28. The electrode holding and dispensing assembly 24 further includes an electrode dispenser 32 mounted in front of the guide rail 28, intermediate the upper and lower ends of the guide rail 28. The dispenser 32 contains a magazine 34 of the electrodes and is designed to deliver one electrode at a time to the channel 30. A T-bar slider 36 (shown partially withdrawn in FIG. 2) is slidingly received in the channel 30 for advancing electrodes from the dispenser 32 to an electrode seating site located at the bottom of the channel 30. A pneumatically operated clamp 38 is provided for selectively retaining an electrode 26 in the seating site.

Figure 3:
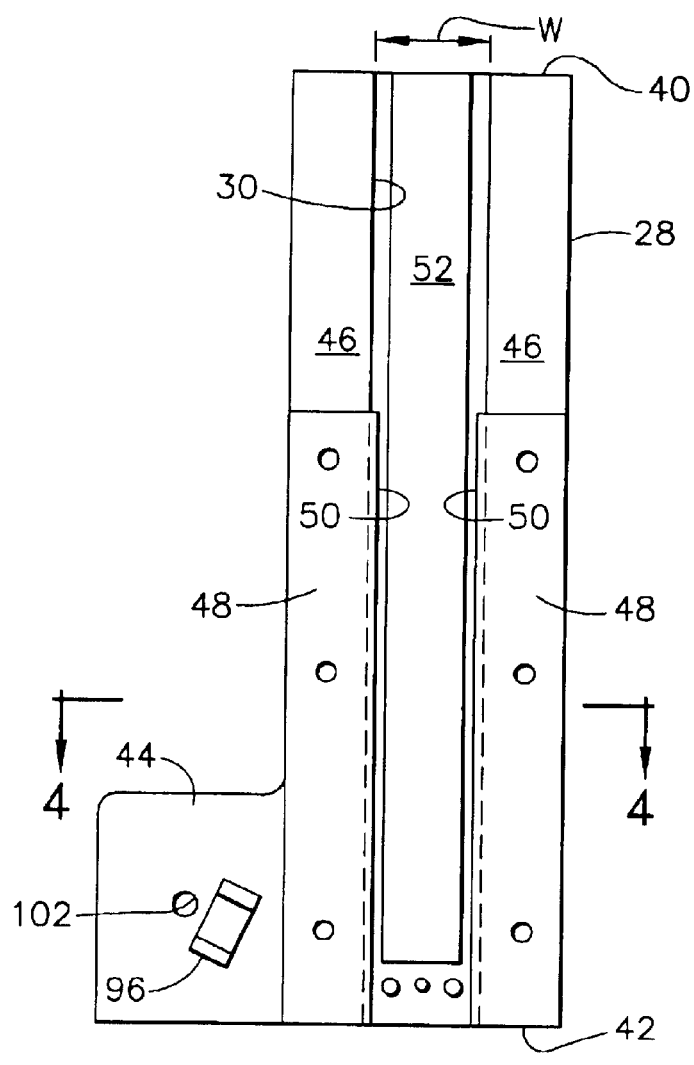
FIG. 3 is a front view of a guide rail from the electrode holding and dispensing assembly of FIG. 1.

As shown in FIG. 3, the guide rail 28 is an elongated, primarily rectangular-shaped member having an upper end 40 and a lower end 42. A support flange 44 extends laterally on one side of the guide rail 28, adjacent to the lower end 42. As will be described in more detail below, the flange 44 supports the pneumatically operated clamp 38, which is not shown in FIG. 3 to facilitate illustration of the guide rail 28. The channel 30 extends the length of the guide rail 28 from the upper end 40 to the lower end 42. The channel 30 is positioned laterally in the guide rail 28 so that the front of the guide rail 28 includes a flat surface 46 on each side of the channel 30. An elongated retaining plate 48 is attached to each flat surface 46. The retaining plates 48 extend lengthwise from the lower end 42 of the guide rail 28 to an intermediate point spaced from the upper end 40. The retaining plates 48 are slightly wider than the flat surfaces 46 so as to define lips 50 that overhang the channel 30. A raised ledge 52 is formed on the back of the channel 30. The ledge 52 extends lengthwise from the upper end 40 of the guide rail 28 to a point spaced above the lower end 42.

The channel 30 is sized to receive one electrode 26 at a time from the electrode dispenser 32. To this end, the channel width, w, is substantially equal to, or just slightly larger than, the width of the electrodes 26. As seen best in FIG. 4, the height of the ledge 52 is less than the depth of the channel 30. This results in a gap between the lips 50 and the ledge 52 having a depth, d. The gap depth d is greater than or equal to the thickness of an electrode 26 but less than twice the electrode thickness. Accordingly, the dispenser 32 can deliver only one electrode at a time to the channel 30. The electrode 26 is able to slide down the channel 30, constrained laterally by the sides of the channel 30 and in a depthwise direction by the lips 50 and the ledge 52.

Figure 5:
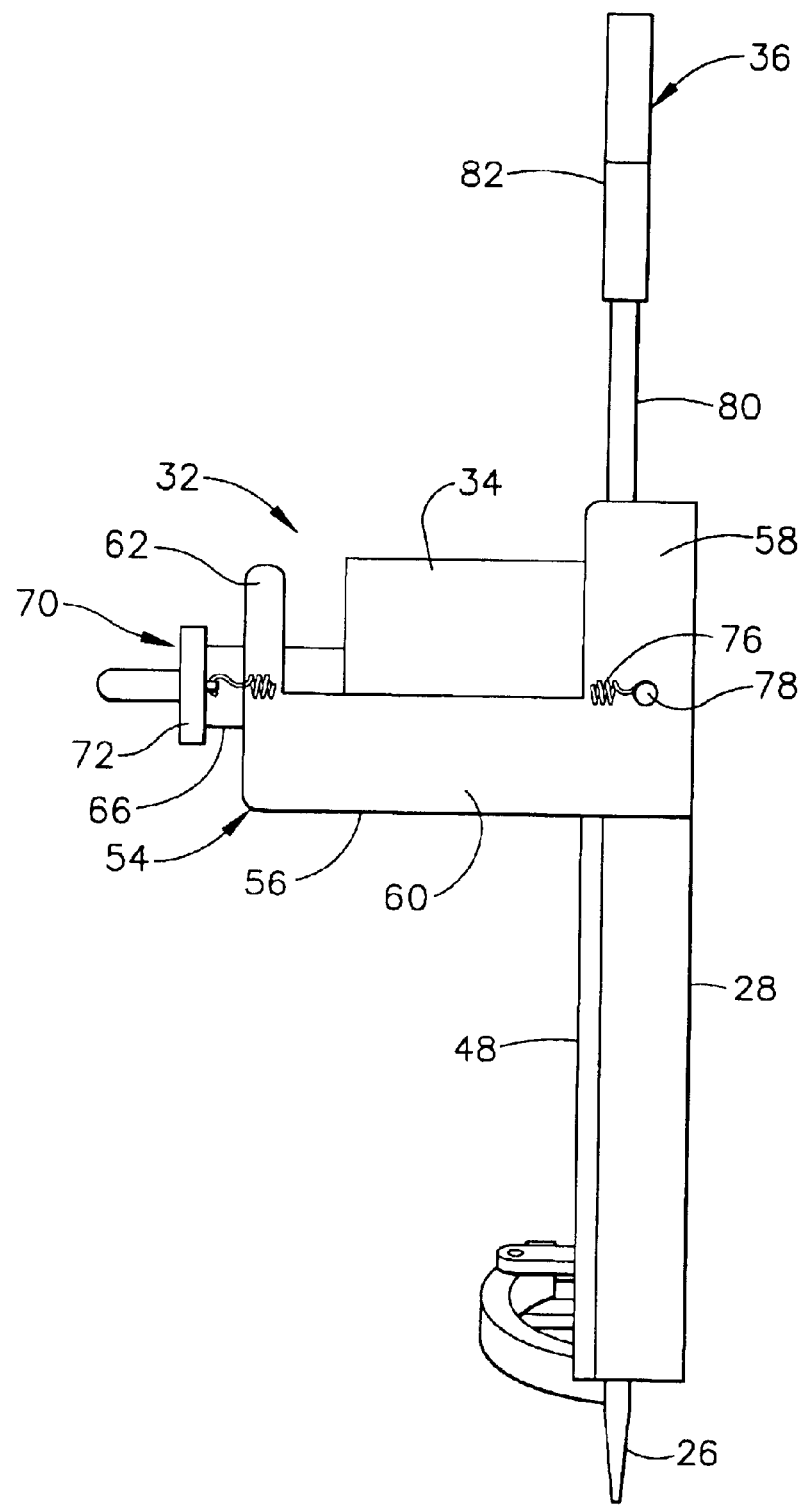
FIG. 5 is a side view of the electrode holding and dispensing assembly of FIG. 1.
Figure 6:
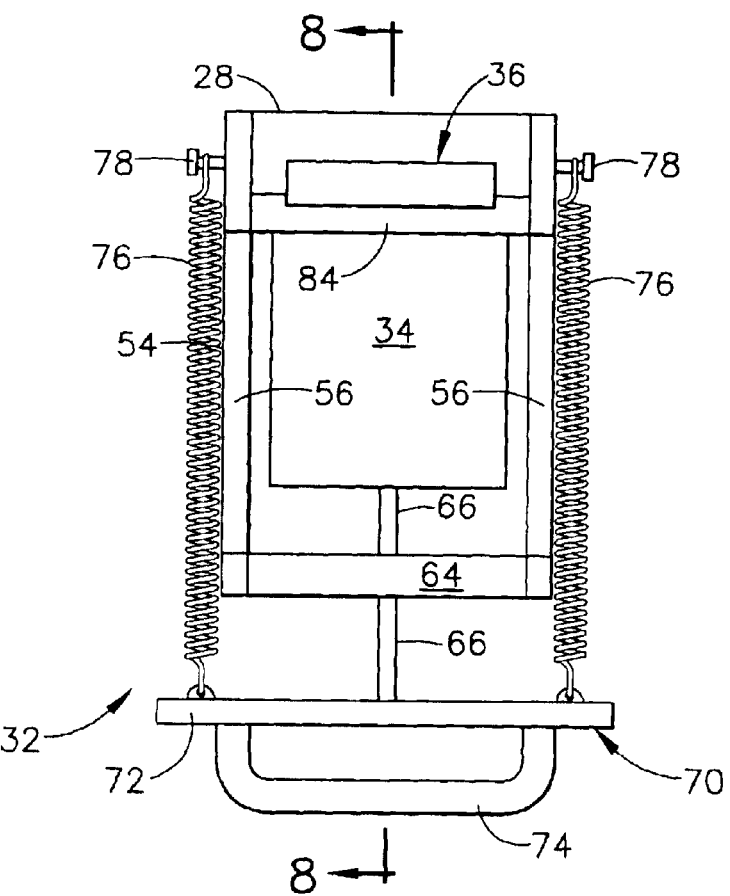
FIG. 6 is a top view of the electrode holding and dispensing assembly of FIG. 1.

Referring to FIGS. 5 and 6, the dispenser 32 includes a cradle 54 for holding the magazine 34. The cradle 54 comprises first and second side plates 56 that are attached to the first and second sides, respectfully, of the guide rail 28. The side plates 56 are integrally formed, substantially U-shaped elements having a first or proximal upright section 58, a central span section 60, and a second or distal upright section 62. Each proximal upright section 58 is attached to the corresponding guide rail side so that the central span sections 60 extend forwardly from the guide rail 28. A front plate 64 is disposed vertically between the two distal upright sections 62. The front plate 64 has an opening formed therein for accepting a plunger 66. A bottom plate 68 (FIGS. 8 and 9) is disposed horizontally between the two central span sections 60 for supporting the magazine 34. The proximal upright sections 58 are attached to the guide rail 28, the central span sections 60 are attached to the bottom plate 68, and the distal upright sections 62 are attached to the front plate 64 by any suitable means including, but not limited to, mechanical fasteners such as screws or bolts.

The magazine 34 is a box-like enclosure that contains a stack of the electrodes 26. The magazine 34 has a first opening in its front end to receive a first end of the plunger 66 and a second opening in its back end through which electrodes are discharged. The plunger 66 is an elongate bar that is slidingly received in the opening in the front plate 64. The first end of the plunger, inside the cradle 54, extends into the magazine 34 to engage the stack of electrodes 26. A handle assembly 70 is attached to the second end of the plunger 66, externally of the cradle 54. The handle assembly 70 includes a base plate 72 that is joined to the plunger 66 perpendicularly thereto and a handle 74 that is attached to the front surface of the base plate 72. The dispenser 32 further includes two springs 76 (shown in partial cutaway in FIG. 5), one on each side of the cradle 54. Each spring 76 is connected at one end to a knob 78 protruding laterally from the respective proximal upright section 58 and at the other end to the base plate 72, which is wider than the cradle 54 to accommodate the spring connection. The springs 76 bias the plunger 66 against the electrode stack in the magazine 34, which in turn pushes the electrode stack toward the channel 30 of the guide rail 28. The plunger 66 can be manually retracted by grasping the handle 74 and pulling away from the cradle 54, against the spring force.

The cradle 54 is located on the guide rail 28 so as to position the magazine 34 above the upper edges of the retaining plates 48. With this positioning, the opening in the back of the magazine 34 through which electrodes are discharged faces an open portion of the channel 30. Accordingly, electrodes discharged from the magazine 34 by the plunger 66 will be pushed into the channel 30. The magazine 34 is placed in the cradle 54 so that electrodes will be delivered to the channel 30 with the proper orientation. For example, comb electrodes would be delivered to the channel 30 with the stingers pointing downward.

When an electrode 26 is delivered to the channel 30, the T-bar slider 36 is manually operated to advance the electrode 26 to the electrode seating site at the bottom of the channel 30. The slider 36 comprises a tongue 80 and a handle 82 connected together in a tee configuration. The thickness of the tongue 80 is substantially equal to the electrode thickness (i.e., not greater than the gap depth d), and the tongue width is not greater than the channel width w. The tongue 80 can thus be received in the channel 30 and slide back and forth in the gap between the lips 50 and the ledge 52. The handle 82 can be grasped to manually move the tongue 80 back and forth in the channel 30. In particular, the slider 36 can be moved between a raised position in which the bottom edge of the tongue 80 is above the magazine 34 so that an electrode 26 can be pushed into the channel 30 and a lowered position in which the bottom edge of the tongue 80 is at the electrode seating site.

A cover plate 84 is attached to the front surface of the guide rail 28, adjacent the upper end 40 thereof, to cover the channel 30 above the magazine 34. The cover plate 84 helps to retain the tongue 80 in the channel 30, particularly when the slider 36 is in the raised position.

Figure 7:
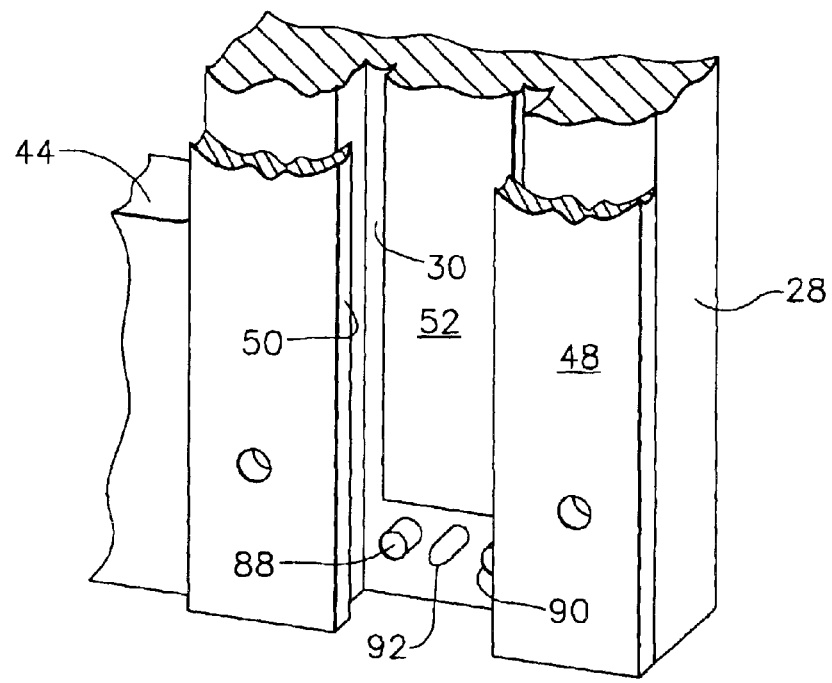
FIG. 7 is a partial perspective view of the view of the electrode holding and dispensing assembly showing its electrode seating site in detail.

The tongue 80 has a predetermined length that is selected to position electrodes at the seating site. In particular, the length of the tongue 80 is such that when the slider 36 is fully inserted into the channel 30 (i.e., in the lowered position), the bottom edge of the tongue 80 is flush with the bottom edge of the ledge 52. The seating site is the portion of the channel 30 below the bottom edge of the ledge 52. The seating site comprises the full depth of the channel 30 and is recessed relative to the ledge 52. As shown in FIG. 7, the seating site has left and right locating pins 88 and 90. The height of the locating pins 88 and 90 is substantially equal to the height of the ledge 52 so that an electrode 26 being pushed down the channel 30 by the slider 36 can pass over the locating pins 88 and 90. When the clamp 38 clamps the electrode 26, the locating pins 88 and 90 are received in corresponding holes formed in the electrode 26, as shown in FIG. 2. The locating pins 88 and 90 are sized differently to ensure that an electrode 26 cannot be clamped into the seating site with an improper orientation. For example, the left locating pin 88 is larger than the right locating pin 90. By sizing the holes in the electrodes 26 in a corresponding manner, the electrodes can be clamped into the seating site in only one orientation.

The seating site further includes a spring-loaded nub 92 located between the locating pins 88 and 90. The nub 92 has a rounded tip and is biased forward by the spring force. When fully extended, the nub height is slightly greater than the height of the ledge 52. Thus, when an unclamped electrode is located at the seating site, the nub 92 pushes the electrode 26 against the lips 50. This prevents the electrode 26 from slipping out of alignment with the locating pins 88 and 90 prior to clamping. When the electrode 26 is clamped down by the clamp 38, the nub 92 is pushed back into the body of the guide rail 28 against the spring force. When the clamp 38 is subsequently released, the nub 92 pushes the electrode 26 off the locating pins 88 and 90 for easy electrode removal.

Figure 4:
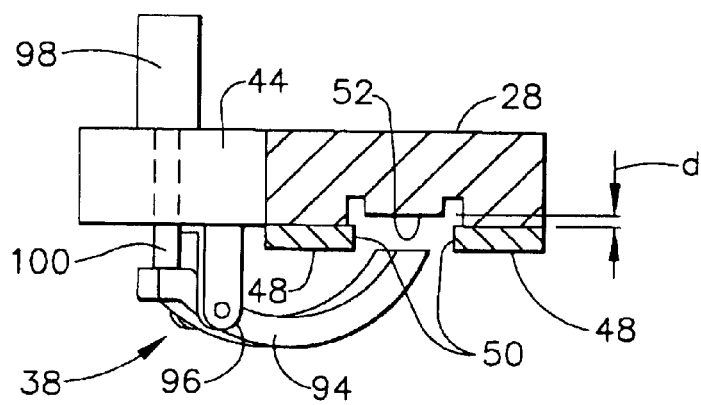
FIG. 4 is a sectional view taken along line 4—4 of FIG. 3.

As best seen in FIGS. 2 and 4, the clamp 38 includes a clamp arm 94 that is pivotally connected at a midpoint to a bracket 96 that protrudes outward from the front side of the support flange 44. A pneumatic cylinder 98 is mounted to the back side of the support flange 44 and controls a rod 100 that extends through a hole 102 (FIG. 3) in the support flange 44. The end of the rod 100 is pivotally connected to a first end of the clamp arm 94. When the pneumatic cylinder 98 is operated to force the rod 100 forward, the rod 100 causes the clamp arm 94 to pivot in the bracket 96 and the second end of the clamp arm 94 engages the electrode 26 in the seating site and pushes it back onto the locating pins 88 and 90. The electrode 26 is thus securely clamped against the back of the channel 30 and held firmly in position during machining operations. Operating the pneumatic cylinder 98 to retract the rod 100 pivots the clamp arm 94 in the other direction so as to release the electrode 26. It should be noted that the pneumatically operated clamp 38 described above is just one possible means of securely holding the electrode 26 in the seating site; other means of clamping or securing electrodes in the seating site are also possible.

Figure 8:
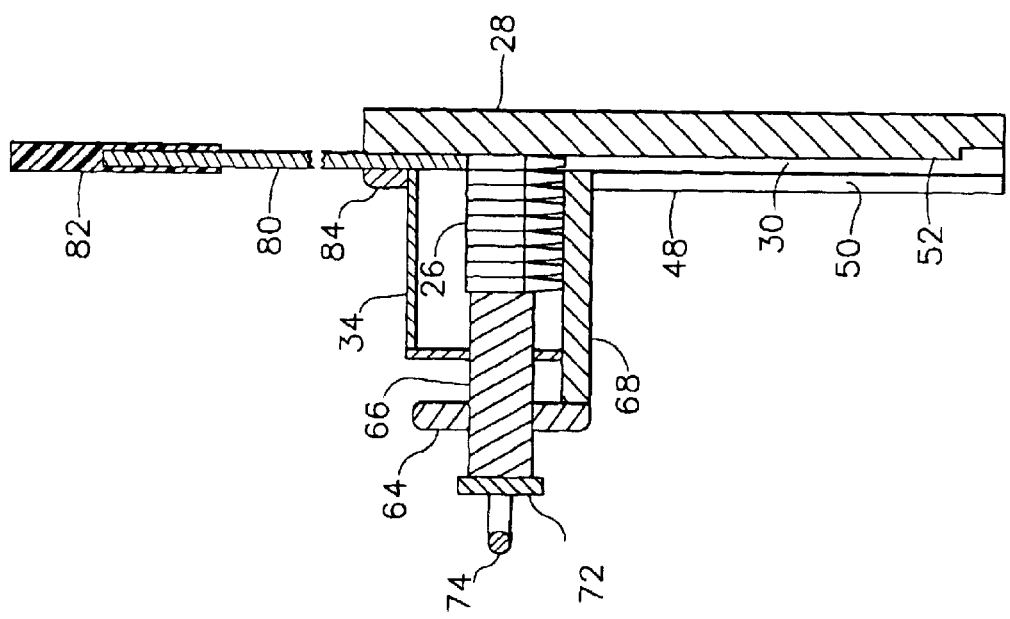
FIG. 8 is a sectional view taken along line 8—8 of FIG. 6, with the slider in its raised position.

In operation, the EDM apparatus 10 is prepared for use by loading the workpiece 16 into the workpiece fixture 14. After assuring that the magazine 34 in place in the cradle 54, an electrode 26 is advanced from the dispenser 32 to the electrode seating site at the bottom of the guide rail 28. This is accomplished by moving the slider 36 to its raised position, as shown in FIG. 8. With the slider in its raised position, the bottom edge of the tongue 80 is above the magazine 34 so that a single electrode 26 from the magazine 34 is pushed into the open channel 30 by the spring-biased plunger 66. The slider 36 is then pushed downward to its lowered position. As the slider is pushed downward, the bottom edge of the tongue 80 engages the electrode 26 and moves it down the channel 30. The slider 36 also blocks the magazine 34 and prevents another electrode from being discharged into the channel 30.

Figure 9:
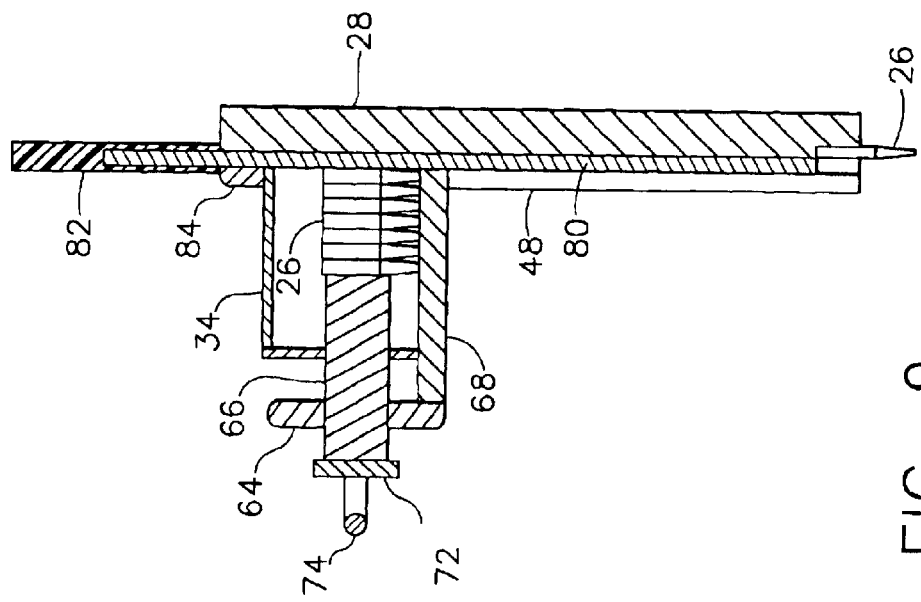
FIG. 9 is a sectional view taken along line 8—8 of FIG. 6, with the slider in its lowered position.

When the slider 36 reaches the lowered position, the bottom edge of the tongue 80 is flush with the bottom edge of the ledge 52 and the electrode 26 will be at the seating site, as shown in FIG. 9. The electrode is held in position by the spring-loaded nub 92 that pushes the electrode 26 against the lips 50. At this point, the pneumatic cylinder 98 is activated to cause the clamp arm 94 to push the electrode 26 onto the locating pins 88 and 90. The clamp 38 holds the electrode 26 securely in position during machining operations.

The electrode 26 will wear down as a result of the EDM process and eventually need to be replaced. This is accomplished by operating the pneumatic cylinder 98 to release the clamp arm 94. The nub 92 will push the spent electrode 26 off the locating pins 88 and 90 for easy removal. Next, the slider 36 is pulled back to its raised position so that a fresh electrode 26 from the magazine 34 is delivered to the channel 30. This electrode is advanced to the seating site and clamped in position in the same manner described above.

When the magazine 34 becomes depleted of electrodes, the empty magazine is replaced with a new magazine. This is done by pulling on the handle 74 to retract the plunger 66 from the magazine 34. The depleted magazine is then removed and a new magazine is placed in the cradle 54. The end of the plunger 66 is directed into the new magazine so as to press against the electrode stack therein under the force of the springs 76. The assembly 24 is now ready to dispense and hold electrodes in the manner described above.

While specific embodiments of the present invention have been described, it will be apparent to those skilled in the art that various modifications thereto can be made without departing from the spirit and scope of the invention as defined in the appended claims.

What is claimed is:

1. An electrode holding and dispensing assembly for use with an electrical discharge machining apparatus, said assembly comprising:

a guide rail having a channel formed therein;

an electrode dispenser positioned to deliver electrodes to said channel; and a slider slidingly received in said channel for advancing electrodes delivered to said channel from said dispenser to an electrode seating site located in said channel.

2. The electrode holding and dispensing assembly of claim 1 wherein said electrode dispenser comprises:

a cradle for holding an electrode magazine;

a plunger slidingly received in said cradle; and means for biasing said plunger toward an electrode magazine held in said cradle.

3. The electrode holding and dispensing assembly of claim 2 wherein said cradle comprises:

first and second side plates attached to first and second sides, respectively, of said guide rail;

a bottom plate disposed horizontally between said first and second side plates; and a front plate disposed vertically between said first and second side plates, said front plate having an opening formed therein for receiving said plunger.

4. The electrode holding and dispensing assembly of claim 2 further comprising a handle attached to one end of said plunger.

5. The electrode holding and dispensing assembly of claim 2 wherein said means for biasing said plunger includes at least one spring.

6. The electrode holding and dispensing assembly of claim 1 wherein said guide rail includes lips overhanging said channel.

7. The electrode holding and dispensing assembly of claim 1 further comprising means for holding an electrode in said electrode seating site.

8. The electrode holding and dispensing assembly of claim 7 wherein said means for holding an electrode includes a clamp arm pivotally connected to said guide rail adjacent to said electrode seating site.

9. The electrode holding and dispensing assembly of claim 1 wherein said channel has locating pins formed therein at said electrode seating site.

10. An electrode holding and dispensing assembly for use with an electrical discharge machining apparatus, said assembly comprising:

a guide rail having an upper end and a lower end and a channel extending from said upper end to said lower end formed therein, said channel including an electrode seating site located adjacent to said lower end;

an electrode dispenser mounted to said guide rail, said electrode dispenser being positioned to deliver one electrode at a time to said channel;

a slider slidingly received in said channel for advancing electrodes delivered to said channel from said dispenser to said electrode seating site; and a clamp mounted to said guide rail for holding an electrode in said electrode seating site.

11. The electrode holding and dispensing assembly of claim 10 wherein said electrode dispenser comprises:

a cradle for holding an electrode magazine;

a plunger slidingly received in said cradle and having first and second ends, said first end being adapted to be received in an electrode magazine held in said cradle; and means for biasing said plunger toward an electrode magazine held in said cradle.

12. The electrode holding and dispensing assembly of claim 11 wherein said cradle comprises:

first and second side plates attached to first and second sides, respectively, of said guide rail;

a bottom plate disposed horizontally between said first and second side plates; and a front plate disposed vertically between said first and second side plates, said front plate having an opening formed therein for receiving said plunger.

13. The electrode holding and dispensing assembly of claim 11 further comprising a handle assembly attached to said second end of said plunger.

14. The electrode holding and dispensing assembly of claim 13 wherein said means for biasing said plunger includes a first spring located on one side of said cradle and a second spring located on another side of said cradle, each spring being connected at one end to said cradle and at another end to said handle assembly.

15. The electrode holding and dispensing assembly of claim 10 wherein said guide rail includes a ledge formed in said channel and lips overhanging said channel, said ledge having a bottom edge and said electrode seating site being located below said bottom edge.

16. The electrode holding and dispensing assembly of claim 15 wherein said slider includes a handle and a tongue connected together, said tongue being received in said channel between said ledge and said lips.

17. The electrode holding and dispensing assembly of claim 16 wherein said tongue has a bottom edge, wherein said bottom edge of said tongue is flush with said bottom edge of said ledge when said slider is fully inserted into said channel.

18. The electrode holding and dispensing assembly of claim 10 wherein said clamp includes a clamp arm pivotally connected to said guide rail adjacent to said electrode seating site and means for pivoting said clamp arm in and out of engagement with an electrode located at said electrode seating site.

19. The electrode holding and dispensing assembly of claim 10 wherein said channel has locating pins formed therein at said electrode seating site.

* * * * *